(12) United States Patent
Milot et al.

(10) Patent No.: US 6,437,788 B1
(45) Date of Patent: Aug. 20, 2002

(54) SYNCHRONIZING GRAPHICS TEXTURE MANAGEMENT IN A COMPUTER SYSTEM USING THREADS

(75) Inventors: Paul Joseph Milot, Georgetown; James Anthony Pafumi, Leander; Robert Paul Stelzer, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,667

(22) Filed: Jul. 16, 1999

(51) Int. Cl.[7] .............................................. G06T 11/40
(52) U.S. Cl. ...................... 345/552; 345/541; 345/502; 345/582; 709/108
(58) Field of Search ................................ 345/502–506, 345/522, 530, 512, 545, 541, 552, 582; 712/228, 229; 709/108, 107

(56) References Cited

U.S. PATENT DOCUMENTS 5,896,141 A * 4/1999 Blaho et al. ................. 345/541
6,208,361 B1 * 3/2001 Gossett ......................... 345/506
6,252,600 B1 * 6/2001 Kohli et al. ................... 345/545

* cited by examiner

*Primary Examiner*—Kee M. Tung
(74) *Attorney, Agent, or Firm*—Mark E. McBurney; Bracewell & Patterson, L.L.P.

(57) ABSTRACT

A computer system having a graphics display with texture management employs a graphics adapter with texture memory. The graphics adapter is 'virtualized' by the operating system. When making a graphics context switch, the state of the graphics adapter including texture memory is saved. Threads are used to allow rapid and frequent context switches. A graphics process that will use texture memory in the adapter reserves a thread, for use during a graphics context switch. The thread calls into the operating system where it is blocked until a graphics context switch is initiated. At that time, the thread is unblocked to do texture management, such as saving of texture memory. During the save portion of the graphics context switch the graphics driver saves the current hardware state of the adapter, and the special purpose texture thread is unblocked to allow texture memory to be processed, and saves texture memory and calls back into the driver where it is blocked. During the restore portion of the graphics context switch the driver restores the state of the adapter to that of another graphics process, except for texture memory. The special purpose texture thread associated with the new graphics process is unblocked, passed an indication that a restore operation is in progress, and restores textures as required and calls back into the driver where it is blocked in the kernel. The driver completes the context switch and the graphics process is dispatched.

9 Claims, 5 Drawing Sheets

SYNCHRONIZING GRAPHICS TEXTURE MANAGEMENT IN A COMPUTER SYSTEM USING THREADS

BACKGROUND OF THE INVENTION

1. Technical Field

This invention relates to operation of computer systems, and more particularly to management of graphics displays for computer systems.

2. Description of the Related Art

Computer graphics workstations are used to generate high-quality graphics images, often three-dimensional, and to run applications programs in a windowed environment. A windowed environment allows a display device to present the output from several applications on a single physical output medium, e.g., a CRT display or monitor. The output display of an application is typically presented in one or more "windows" in a windowed environment. One or more unique "contexts" may be associated with the application area of each window. The contexts define the properties and parameters of the window area for that application. Thus, context refers to the data used by a graphics system to control the rendering process, i.e., a process through which a displayable image is generated. To enhance performance, computer graphics systems are moving toward the use of multiple graphics threads, each thread potentially having its own graphics context.

Graphics clients are typically compute-intensive and demanding on system bus bandwidth, and the threads for graphics clients can run on multiple processors in an attempt to satisfy their requirement for host processing cycles. Whenever the graphics system switches between clients, the state information must be saved and restored at many places in the graphics pipeline.

Increasingly, computer graphics systems are supporting multiple 2D and 3D contexts. For example, a graphics system may have in one window a high quality rendering of an airplane being developed. In another window there may be an interactive dialog in which the designer can change the properties of the airplane or make inquiries about it. In yet another window there may be a clock, and in still another window an inter-office mailing application may be running.

An operating system such as AIX supports the concept of 'virtual graphics adapters,' which means that each graphics process appears to have exclusive, direct access to the adapter hardware. To accomplish this illusion, the AIX operating system, in conjunction with the graphics adapter device driver, saves and restores the state of the adapter, known as a graphics context switch. Thus, a single hardware resource is time-shared with multiple graphics processes.

As the functionality and complexity of graphics accelerators increase, the amount of state information that must be save and restored during a graphics context switch is also growing, specifically in the area involving texture management. For example, applications creating complex, texture-intensive images may require large amounts of texture memory. For performance reasons, this memory resides on the adapter, and for some newer adapters is mega-bytes in size. To 'virtualize' adapters with large on-board texture memory, the device driver must save and restore all the adapter's state, including texture memory, associated with a graphics process. The memory used to save this state information is obtained from the memory pool used within the operating system. The problem is that this state information becomes large when adapters. with on-board texture memory are being used. It only takes a few graphics processes using an adapter with a large texture memory to impact the operating system by reducing its available system memory.

In addition, managing texture memory can result in a complex device driver since the application program interfaces (APIs) have all the information about texture memory and how it has been allocated. Information about how the texture memory is allocated would need to be available to the driver otherwise all texture memory would need to be saved/restored, prohibiting any optimization (i.e., save only what needs to be saved). Thus, in prior arrangements, a disadvantage has been that the complexity of texture management has been in the driver, in kernel space, rather than being in user space.

SUMMARY OF THE INVENTION

It is therefore one object of the present invention to provide an improved method of managing graphics displays for computer systems, particularly by using threads.

It is another object of the present invention to provide an improved graphics texture management method and system for computer graphics displays.

It is yet another object of the present invention to provide improved context-switching in graphics display management for computer systems in which the graphics adapter is virtualized.

The above as well as additional objects, features, and advantages of the present invention will become apparent in the following detailed written description.

According to one embodiment of the invention, a computer system having a graphics display with texture management employs a graphics adapter with texture memory. The graphics adapter is 'virtualized' by the operating system. When making a graphics context switch, the state of the graphics adapter including texture memory is saved and restored. Threads are used to trigger rapid and frequent context switches. A graphics process that will use texture memory in the adapter reserves a thread which is registered with the driver, for use during a graphics context switch. The thread calls into the operating system where it is blocked by the driver until a graphics context switch associated with this thread is initiated. At that time, the thread is unblocked by the driver to allow the texture manager to do the saving of texture memory. During the save portion of the graphics context switch the graphics driver saves the current hardware state of the adapter, and the special purpose texture thread is unblocked, and saves texture memory and calls back into the driver where it is blocked. The save operation also passes an indication to the texture manager that a save is in progress. During the restore portion of the graphics context switch the driver restores the state of the adapter to that of another graphics process, except for texture memory. The special purpose texture thread associated with the new graphics process is unblocked, passed an indication that a restore operation is in progress, and restores textures as required and calls back into the driver where it is blocked in the kernel. The driver completes the context switch and the graphics process is dispatched. Basically, what is preferred is to remove the complexity of texture management from the driver (in kernel space) to a user space texture manager.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment, when read in conjunction with the accompanying drawings, wherein:

DETAILED DESCRIPTION OF PREFERRED EMBODIMENT

Figure 1:
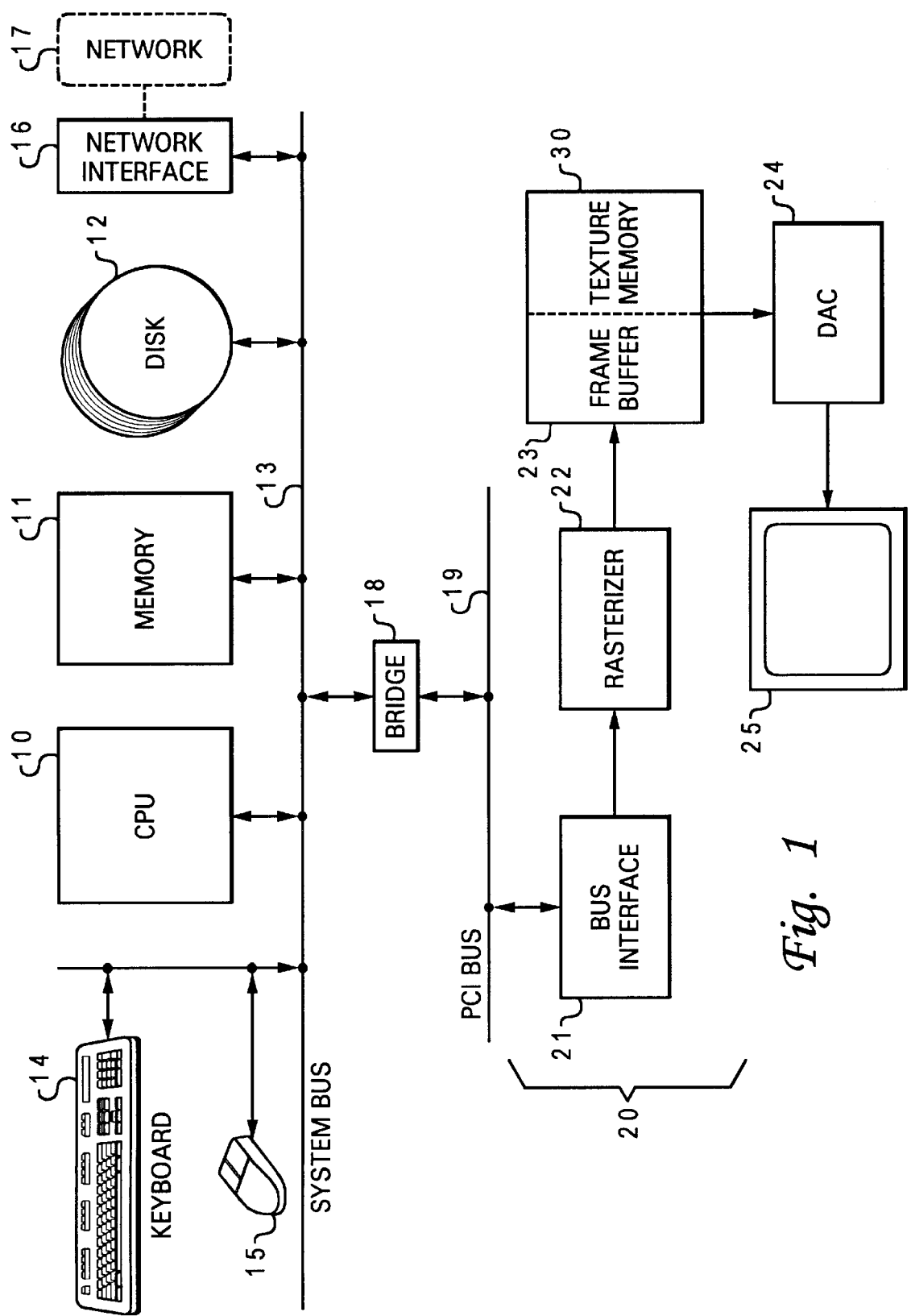
FIG. 1 is an electrical diagram in block form of a computer system which may use the graphics features of one embodiment of the present invention.

Referring to FIG. 1, a computer system is shown which has a graphics display output that may utilize features of the invention. The computer system includes a CPU 10, a main (physical) memory 11, and disk storage 12, interconnected by a system bus 13. Other peripherals such as a keyboard 14, mouse 15, and adapter card 16 for interface to a network 17 are included in the computer system. The graphics subsystem is connected to the CPU and memory via a bridge 18 and PCI bus 19. This is just an example of one embodiment of a computer system and bus arrangement; features of the invention may be used in various system configurations. The graphics subsystem includes a graphics adapter 20 which may include a bus interface chip 21 described in detail in co-pending application Ser. No. 08/165,618, filed Oct. 2, 1998, assigned to the assignee hereof, connected to the PCI bus, 19 to handle transfer of commands and data from the CPU and memory to the graphics subsystem. A rasterizer 22 generates pixel data for a bit-mapped image of the screen to be displayed, for storing in a frame buffer 23. The data stored in the frame buffer is read out via a digital-to-analog converter 24 to a CRT display 25, for each screen update. The frame buffer 23 is bit-mapped to the screen of the display; each pixel of the display has a corresponding location in the frame buffer storing the definition of what is to be displayed for that one pixel when the raster scan is performed. This definition includes color, intensity, etc., and usually contains reference to palettes or tables for expanding the information to be displayed for the pixel. In addition, the pixel data may include information used to select between stereo or mono image in the particular part (window) of the display associated with this pixel.

Figure 2:
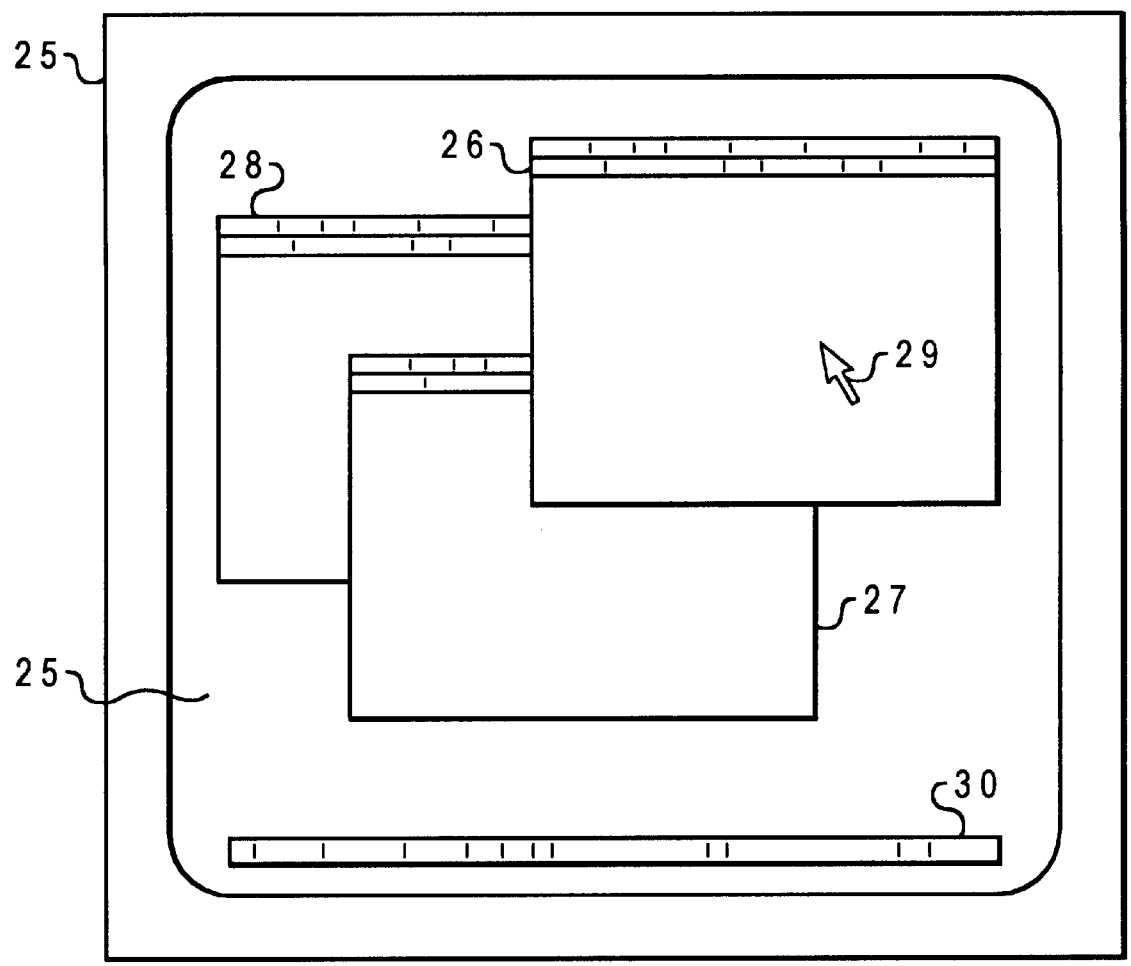
FIG. 2 is an enlarged view of the video display in the system of FIG. 1.

As seen in FIG. 2, the display 25 has a screen which typically shows a number of windows 26, 27, and 28 for different processes or applications that are running at a given time on the computer system, as well as a cursor and various bars on the background of the screen, usually representing operating system information for X Windows, running under AIX, or the like. Some of the windows 26, 27, 28 may be 2D applications, some 3D, some stereo, etc.

In order avoid tying up the busses 13 and 19, and using too much of the CPU time, the adapter 20 generates most of the pixel data to be stored in the frame buffer 23. The CPU generates graphics primitives which describe what is to be displayed in a higher-level or more abstract expression, and these are transferred via busses 13 and 19 and interface 21 to the rasterizer 22, which generates the pixel data. The bandwidth used by the output of the rasterizer is much greater than could be used on the busses 13 and 19 for video data. For example, a 1024×1024 color screen refreshed 50/sec., with 24-bits per pixel, requires a bandwidth of 150-Mbytes/sec., so the busses downstream of the rasterizer operate at this level, for screen data. A much lower bandwidth is dictated for transfers over the busses 13 and 19, in supporting the graphics subsystem from the CPU 10 and memory 11. The adapter 20 and bus interface circuitry 21 is constructed to minimize PCI bus traffic.

Texture memory 30 is also located in the adapter 20. Texture for an image being displayed is generated in the adapter 20 and is stored locally in texture memory 30 instead of being transferred back and forth over the busses 13 and 19, which would require a lot of bandwidth. The texture memory may be perhaps 128-Mbyte in size, and a given application might in some cases use all of it for one texture.

An operating system such as AIX used in the system of FIG. 1 supports the concept of virtual graphics adapters, which means that each graphics process running on the CPU 10 appears to have exclusive, direct access to the adapter 20 hardware. To accomplish this illusion, the AIX operating system, in conjunction with the graphics adapter device driver, saves and restores the state of the adapter, and this is known as a graphics context switch. Thus, a single hardware resource, the graphics subsystem including the adapter 20, is time-shared with multiple graphics processes running on the CPU 10.

As the functionality of a graphics accelerator such as the adapter 20 increases, the amount of state information that must be saved and restored during a graphics context switch also grows, specifically for texture management. For example, applications creating complex, texture-intensive images require large amounts of texture memory 30. For performance reasons, this memory resides on the adapter. To 'virtualize' this adapter 20 with a large on-board texture memory 30, the device driver must save all the adapter's state, including texture memory, associated with a graphics process. The memory used to save this state information is obtained from the memory pool 11 used by the operating system. The problem is that this state information becomes large when the adapter 20 with on-board texture memory 30 is used. Only a few graphics processes running on the CPU 10 using the adapter 20 with large texture memory 30 impacts the operating system by reducing available system memory.

Figure 3:
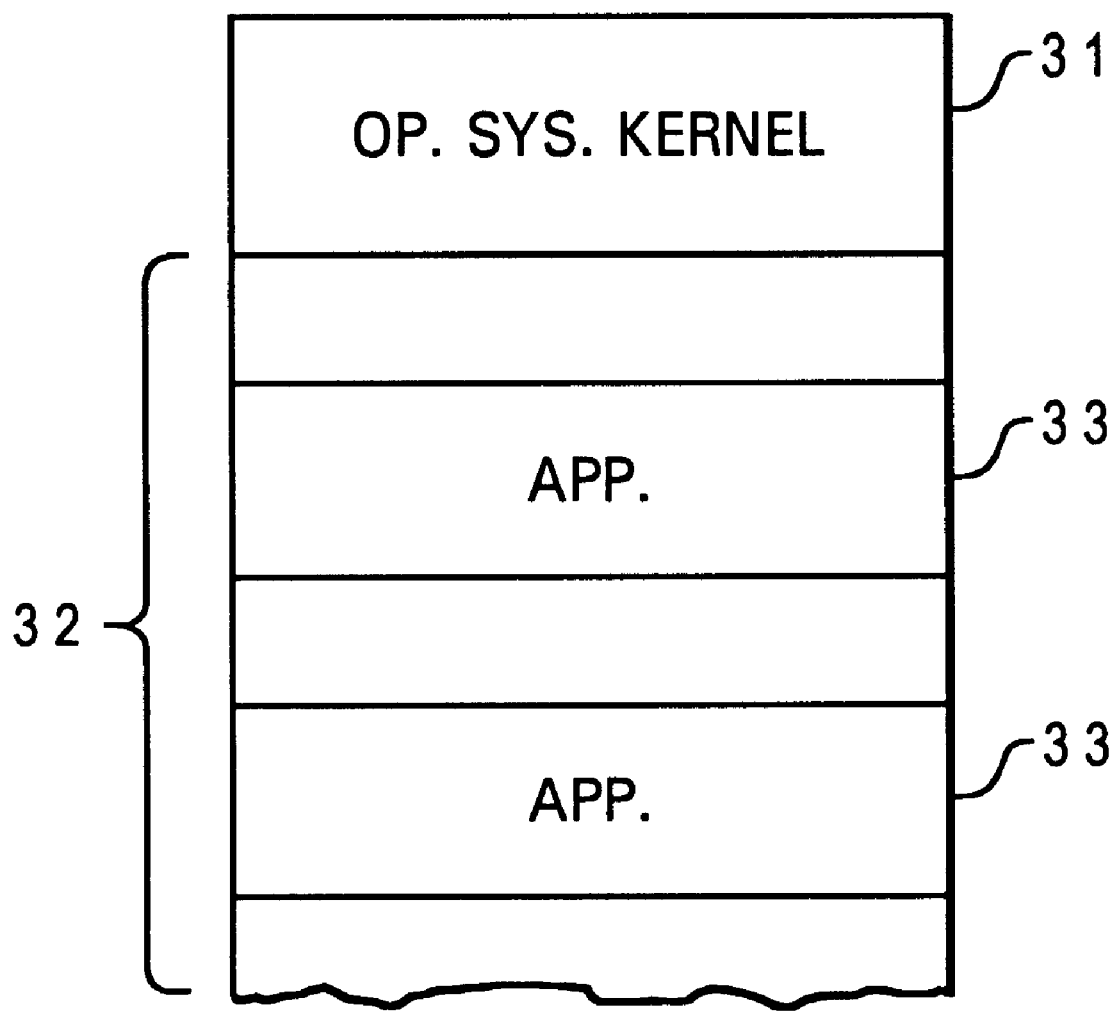
FIG. 3 is a diagram of memory space of the CPU in the system of FIG. 1.

In FIG. 3, a representation of the memory space of the CPU 10 shows that a kernel space is used by the operating system in the usual manner, and user space 32 is used for various applications 33 which may be active. Some of the user data for applications in user space at any given time may be in physical memory 11 or may be in disk storage 12 as the physical memory resources are time-shared by the virtual memory management functions of the operating system.

According to the invention, threads are used to address the problem of making rapid and frequent context switches in the system of FIG. 1. A graphics process, e.g., one of the applications 33, that will use texture memory 30 in the adapter reserves a thread which is set up in the kernel memory 31; the thread is for use during a graphics context switch. The thread calls into the operating system, i.e., kernel 31, where it is blocked until a graphics context switch is initiated. At that time, the thread is unblocked to do any special processing required for textures.

Figure 4:
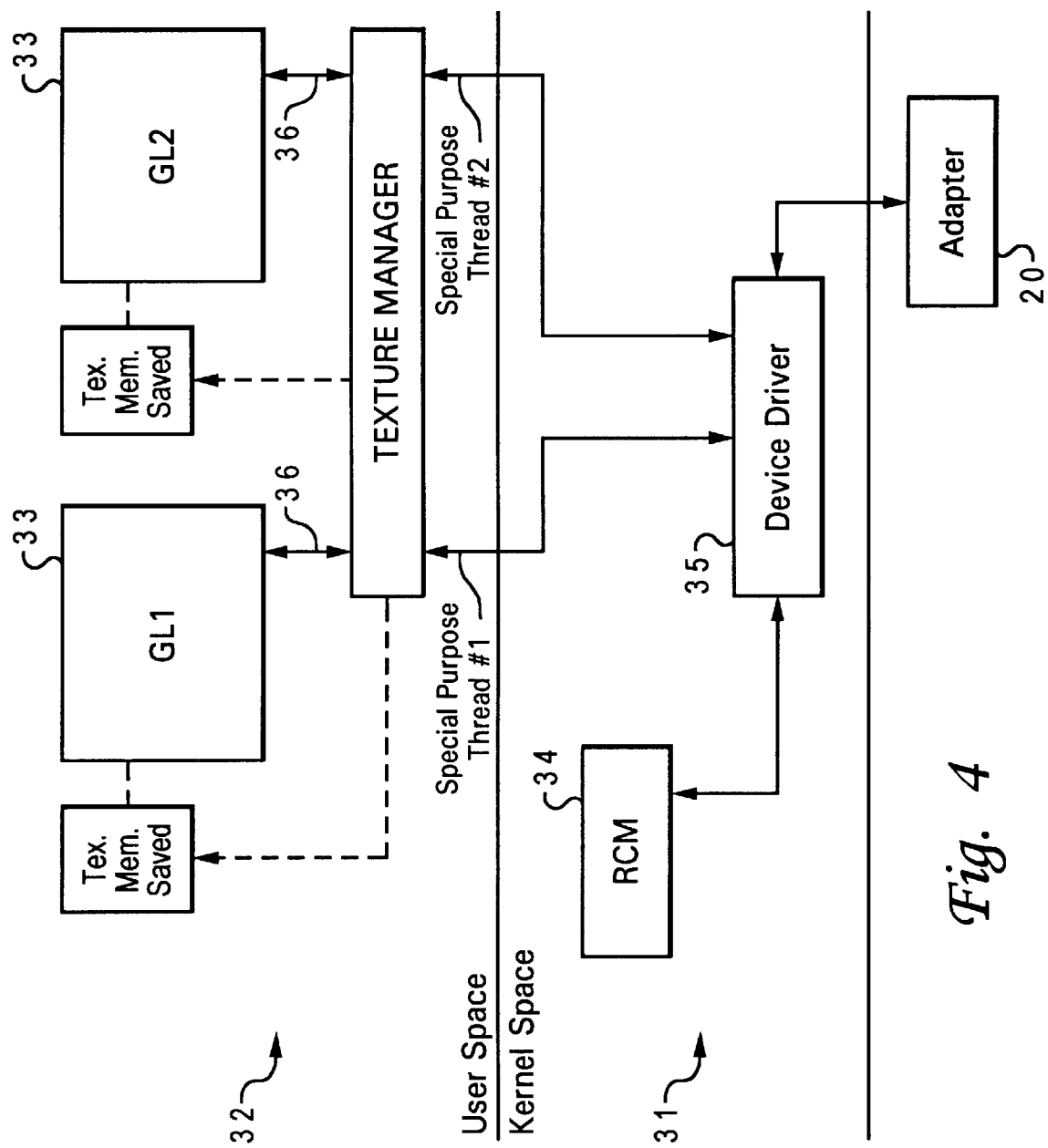
FIG. 4 is more detailed diagram of memory space of FIG. 3.

Referring to FIG. 4, part of the memory space of FIG. 3 is shown in more detail in a different way. The user space 32 contains in this example some active applications (e.g., APIs) 33 active, and each of these has one or more threads, with the rendering context manager RCM 34 in the kernel space 31 determining which thread has access to graphics resources. The RCM acts as traffic control, saying which thread is allowed to run at any given moment. Also in the kernel space 31 is a device driver 35 which manages the graphics hardware 20.

Figure 5:
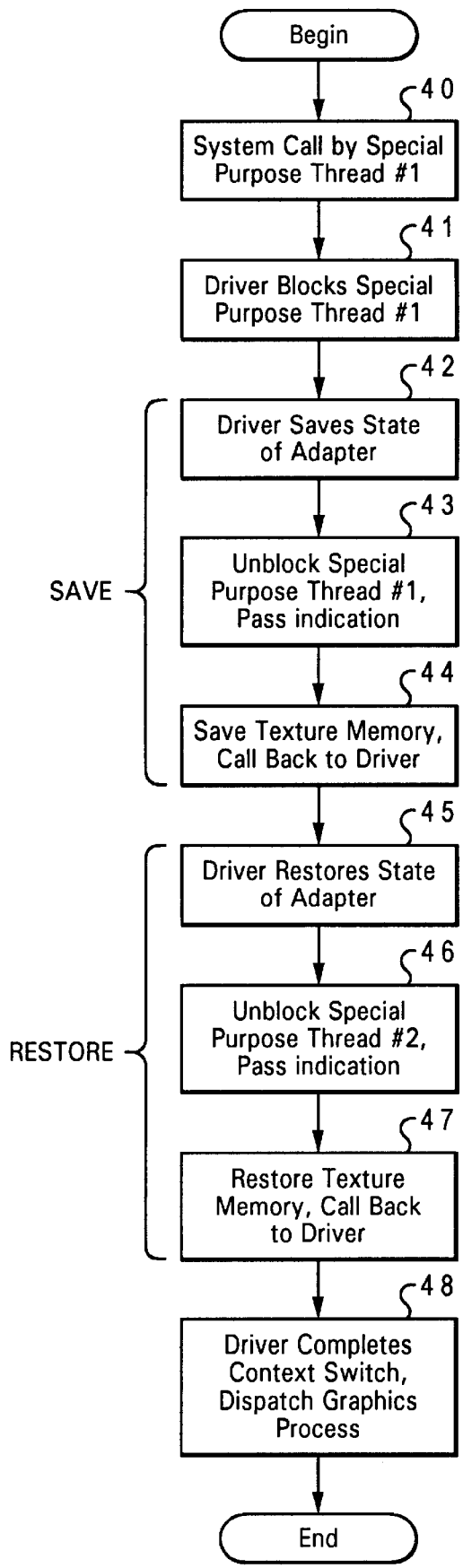
FIG. 5 is a logic flow chart of the method used in the system of FIGS. 1–4 for saving texture memory in a graphics context switch.

According to the invention, each graphics process 33 which will use texture memory 30 causes a special purpose thread 36 to be spawned for managing texture memory 30 on the adapter 20. The steps in making a graphics context switch will be described with reference to the logic-flow chart of FIG. 5. A system call is made by the special purpose thread 36 to the graphics adapter device driver 35 identifying it as a thread to be given control during graphics context switching, block 40. The driver 35 blocks the special purpose thread 36 in the kernel 31 and associates it with the graphics context of the process, block 41. During the save portion of the graphics context switch (a) the driver 35 saves the current hardware state of the adapter 20 (block 42), (b) the special purpose texture thread 36 associated with the graphics process whose graphics context is currently on the adapter 20 is unblocked and passes an indication that a save operation is in progress (block 43), (c) the special purpose thread 36 does texture management (i.e., saves texture memory 30) and calls back into the driver 35 where it is blocked in the kernel 31 and the driver resumes the context switch. During the restore portion of the graphics context switch (a) the driver 35 restores the state of the adapter 20 to that of another graphics process, except for texture memory (block 45), (b) the special purpose texture thread 36 associated with the new graphics process being put on the adapter 20 is unblocked and passed an indication that a restore operation is in progress (block 46), (c) the special purpose thread 36 restores textures if required and calls back into the driver 35 where it is blocked in the kernel 31 (block 47). The driver 35 completes the context switch and the graphics process is dispatched, block 48.

Although this method addresses the problem described above regarding graphics context switching when large texture memory is involved, the method and features are not specific to graphic applications using textures. The method can be used for synchronization between the operating system and user processes when other methods such as signals are not sufficient.

The advantages of this method are several. First, texture state information is allocated from shared memory 32 and texture data associated with a graphics process is allocated from the process's private memory, thus eliminating the requirement for large amounts of kernel memory 31 being dedicated to textures. Second, the complexities of texture management resides in the graphics API 33, not the kernel 31, thus minimizing the chances of destabilizing the system. Third, device driver interfaces are not impacted when different texture management schemes are implemented due to API changes, or new algorithms.

While the invention has been shown and described with reference to a particular embodiment, it will be understood that various changes in form and detail of the preferred embodiment, as well as other embodiments of the invention, may be made by those skilled in the art without departing from the true spirit and scope of the invention.

What is claimed is:

1. A method of performing graphics context switching in a computer system having a graphics adapter, said method comprising:

mapping a texture map in a shared memory in the computer system, said texture map describing which of a plurality of texture data blocks in a graphics adapter texture memory are currently controlled by a first process, a copy of said texture data blocks being stored in a private memory of said first process;

reserving a special purpose thread for a second process;

initiating a context switch in the graphics adapter from said first process to said second process; and using said special purpose thread for said second process, instructing a kernel in an operating system to assign control of texture data in said graphics adapter texture memory from said first process to said second process according to said texture map.

2. The method of claim 1, further comprising:

storing a new texture data block for said second process in a private memory of said second process; and upon a determination, according to said texture map, that said new texture data block is not in said graphics adapter texture memory, using said special purpose thread for said second process to store said new texture data block for said second process in said graphics adapter texture memory.

3. The method of claim 1, further comprising:

reserving a special purpose thread for said first process; and using said special purpose thread for said first process, removing texture data of said first process from said graphics adapter texture memory, where said texture data of said first process is not a same texture data being used by said second process.

4. A computer system having a graphics adapter, said computer system comprising:

means for mapping a texture map in a shared memory in the computer system, said texture map describing which of a plurality of texture data blocks in a graphics adapter texture memory are currently controlled by a first process, a copy of said texture data blocks being stored in a private memory of said first process;

means for reserving a special purpose thread for a second process;

means for initiating a context switch in the graphics adapter from said first process to said second process; and means for, using said special purpose thread for said second process, instructing a kernel in an operating system to assign control of texture data in said graphics adapter texture memory from said first process to said second process according to said texture map.

5. The computer system of claim 4, further comprising:

means for storing a new texture data block for said second process in a private memory of said second process; and means for, upon a determination, according to said texture map, that said new texture data block is not in said graphics adapter texture memory, using said special purpose thread for said second process to store said new texture data block for said second process in said graphics adapter texture memory.

6. The computer system of claim 4, further comprising:

means for reserving a special purpose thread for said first process; and means for, using said special purpose thread for said first process, removing texture data of said first process from said graphics adapter texture memory, where said texture data of said first process is not a same texture data being used by said second process.

7. A computer program product, residing on a computer usable medium, for performing graphics context switching in a computer system having a graphics adapter, said computer program product comprising:

program code means for mapping a texture map in a shared memory in the computer system, said texture map describing which of a plurality of texture data blocks in a graphics adapter texture memory are currently controlled by a first process, a copy of said texture data blocks being stored in a private memory of said first process;

program code means for reserving a special purpose thread for a second process;

program code means for initiating a context switch in the graphics adapter from said first process to said second process; and program code means for, using said special purpose thread for said second process, instructing a kernel in an operating system to assign control of texture data in said graphics adapter texture memory from said first process to said second process according to said texture map.

8. The computer program product of claim 7, further comprising:

program code means for storing a new texture data block for said second process in a private memory of said second process; and program code means for, upon a determination, according to said texture map, that said new texture data block is not in said graphics adapter texture memory, using said special purpose thread for said second process to store said new texture data block for said second process in said graphics adapter texture memory.

9. The computer program product of claim 7, further comprising:

program code means for reserving a special purpose thread for said first process; and program code means for, using said special purpose thread for said first process, removing texture data of said first process from said graphics adapter texture memory, where said texture data of said first process is not a same texture data being used by said second process.

* * * * *